US012783866B2

(12) United States Patent
Yin et al.

(10) Patent No.: US 12,783,866 B2
(45) Date of Patent: Nov. 3, 2026

(54) DATA AUGMENTATION FOR TRAINING ARTIFICIAL INTELLIGENCE MODEL

(71) Applicant: INTERNATIONAL BUSINESS MACHINES CORPORATION, Armonk, NY (US)

(72) Inventors: Kun Yan Yin, Ningbo (CN); Xue Ping Liu, Beijing (CN); Yun Jing Zhao, Beijing (CN); Fei Wang, Dalian (CN); Yu Tao Wu, Changshu (CN); Lu Yu, Wuhu (CN)

(73) Assignee: International Business Machines Corporation, Armonk, NY (US)

( * ) Notice: Subject to any disclaimer, the term of this patent is extended or adjusted under 35 U.S.C. 154(b) by 736 days.

(21) Appl. No.: 17/502,791

(22) Filed: Oct. 15, 2021

(65) Prior Publication Data

US 2023/0121812 A1 Apr. 20, 2023

(51) Int. Cl.
*G06N 3/08* (2023.01)
*G06F 18/214* (2023.01)

(52) U.S. Cl.
CPC ............. *G06N 3/08* (2013.01); *G06F 18/214* (2023.01)

(58) Field of Classification Search
CPC ................................ G06N 3/08; G06F 18/214
See application file for complete search history.

(56) References Cited

U.S. PATENT DOCUMENTS 8,244,498 B2 * 8/2012 Wold ...................... G06F 17/18 703/2
10,013,436 B1 * 7/2018 Cai ..................... G06F 16/5866
10,108,902 B1 * 10/2018 Lockett ................. G06F 40/169
11,334,762 B1 * 5/2022 Wrenninge ........... G06F 18/214
2002/0012478 A1 * 1/2002 Thirion ..................... G06T 3/14 382/294
2008/0046187 A1 * 2/2008 Paxia ..................... G16B 30/10 702/19
2009/0157707 A1 * 6/2009 Ito ......................... G06F 18/214
2016/0210535 A1 * 7/2016 Takimoto .............. G06F 18/217
2017/0228659 A1 * 8/2017 Lin .......................... G06N 5/04

(Continued)

OTHER PUBLICATIONS

Hiroshi Inoue. Data Augmentation by Pairing Samples for Images Classification. Arxiv.org. Apr. 11, 2018. https://arxiv.org/abs/1801.02929. (Year: 2018).*

(Continued)

*Primary Examiner* — Jeremy L Stanley
(74) *Attorney, Agent, or Firm* — CHIP LAW GROUP

(57) ABSTRACT

Data augmentation is described to train an artificial intelligence model that includes analyzing a first data set to measure an amount of data in the data set and the variation in the amount of data in the first data set to determine deficiencies for training an artificial intelligence model. Augmenting data is added for the first data set having an amount of data measured that fails to meet a threshold value. Deficiencies in the variation in the amount of data in the first data set are augmented using augmentation methods outside the variation scope of the first data set to provide a second data set of augmented data. An artificial intelligence model is trained with a combined data set of the first data set, and the second data set of augmented data when the first and second data set have an amount of data meeting the threshold value.

20 Claims, 7 Drawing Sheets

(56) References Cited

U.S. PATENT DOCUMENTS

| | | | | |
|---|---|---|---|---|
| 2017/0323201 | A1* | 11/2017 | Sutskever | G06F 3/0653 |
| 2017/0359559 | A1* | 12/2017 | Patel | H04N 9/73 |
| 2018/0018587 | A1* | 1/2018 | Kobayashi | G06N 20/00 |
| 2018/0074786 | A1* | 3/2018 | Oberbreckling | G06F 16/2255 |
| 2018/0082215 | A1* | 3/2018 | Mizobuchi | G06N 3/08 |
| 2019/0164014 | A1* | 5/2019 | Tanaka | G06N 20/00 |
| 2019/0258901 | A1* | 8/2019 | Albright | G06N 3/084 |
| 2020/0050965 | A1* | 2/2020 | Harvill | G06N 5/04 |
| 2020/0082210 | A1* | 3/2020 | Watson | G06F 18/22 |
| 2020/0118027 | A1* | 4/2020 | Kikuchi | G06F 21/564 |
| 2020/0134446 | A1* | 4/2020 | Soni | G06N 3/047 |
| 2020/0300778 | A1* | 9/2020 | Hoshino | G06V 10/945 |
| 2020/0302234 | A1* | 9/2020 | Walters | G06F 16/9035 |
| 2020/0342362 | A1* | 10/2020 | Soni | G06N 3/044 |
| 2021/0142113 | A1* | 5/2021 | Girard | G06V 40/1388 |
| 2021/0158137 | A1* | 5/2021 | Sasao | G06N 3/04 |
| 2021/0201208 | A1* | 7/2021 | Bhole | G06F 18/214 |
| 2021/0241037 | A1* | 8/2021 | Lisowska | G06V 10/764 |
| 2021/0264283 | A1* | 8/2021 | Tamilselvam | G06N 3/086 |
| 2021/0295205 | A1* | 9/2021 | Ranco | G06F 17/16 |
| 2022/0036128 | A1* | 2/2022 | Levanony | G06F 18/24 |
| 2022/0138561 | A1* | 5/2022 | Prendki | G06N 3/08<br>706/12 |
| 2022/0156577 | A1* | 5/2022 | Jha | G06N 3/08 |
| 2022/0180122 | A1* | 6/2022 | Kondo | G06N 3/084 |
| 2022/0180123 | A1* | 6/2022 | Khonsari | G06N 3/09 |
| 2022/0207434 | A1* | 6/2022 | Xue | G06N 5/01 |
| 2022/0215653 | A1* | 7/2022 | Inoshita | G06V 10/772 |
| 2022/0374654 | A1* | 11/2022 | Németh | G06N 20/00 |
| 2022/0383038 | A1* | 12/2022 | Hines | G06N 3/045 |
| 2023/0020543 | A1* | 1/2023 | Piao | G06F 18/285 |
| 2023/0048097 | A1* | 2/2023 | Clausen | G06T 5/70 |
| 2023/0121812 | A1* | 4/2023 | Yin | G06V 10/774<br>706/15 |
| 2023/0162049 | A1* | 5/2023 | Hall | G16H 40/67<br>706/45 |
| 2024/0078439 | A1* | 3/2024 | Sun | G06N 3/098 |
| 2024/0135246 | A1* | 4/2024 | Miyamoto | G06N 3/006 |

OTHER PUBLICATIONS

Cubuk, Ekin D., et al. "Autoaugment: Learning augmentation strategies from data," Proceedings of the IEEE/CVF Conference on Computer Vision and Pattern Recognition, Jun. 2019, pp. 113-123.

Xu, Ju, et al. "Automatic data augmentation for 3D medical image segmentation," International Conference on Medical Image Computing and Computer-Assisted Intervention, Oct. 2020, pp. 378-387, Springer, Cham.

Li, Sharon Y., "Automating Data Augmentation: Practice, Theory and New Direction," Apr. 2020, ai.stanford.edu/blog/data-augmentation/, Apr. 2020, 5 pages.

Galdran, Adrian, et al. "Data-driven color augmentation techniques for deep skin image analysis," arXiv preprint arXiv:1703.03702, Mar. 2017, pp. 1-4.

Devries, Terrance, et al., "Dataset augmentation in feature space," arXiv preprint arXiv:1702.05538, Feb. 2017, 12 pages.

Mounsaveng, Saypraseuth, et al., "Learning data augmentation with online bilevel optimization for image classification," Proceedings of the IEEE/CVF Winter Conference on Applications of Computer Vision, Jan. 2021, 10 pages.

Zhou, Fengwei, et al., "MetaAugment: Sample-Aware Data Augmentation Policy Learning," arXiv preprint arXiv:2012.12076, Dec. 2020, 23 pages.

Mell, Peter, et al., "The NIST Definition of Cloud Computing," Sep. 2011, 7 pages.

* cited by examiner

DATA AUGMENTATION FOR TRAINING ARTIFICIAL INTELLIGENCE MODEL

BACKGROUND

The present invention generally relates to artificial intelligence, and in some embodiments to the application of data in training an artificial intelligence model.

Data plays a role in preparing an accurate model. Data enhancement is a step in artificial intelligence (AI) vision model training. The use of appropriate data enhancement methods can increase the number of datasets, thereby maximizing the use of each sample in a small sample set, while improving the robustness of the model. Data enhancement methods can also prevent overfitting during training, so that the training can product a better machine learning model. The process of manual data enhancement is that first the customer or data scientist construct the dataset, and then the data scientist analyzes the dataset. The data scientist can select one or more data enhancement methods based on the manual analysis results, using the corresponding data enhancement algorithm to enhance the data, and finally getting the enhanced dataset. This is a time consuming process.

SUMMARY

In accordance with an embodiment of the present invention, a computer-implemented method for data augmentation to train an artificial intelligence model is described that includes analyzing a first data set with a data analyzer to measure an amount of data in the data set and the variation in the amount of data in the first data set to determine deficiencies for training an artificial intelligence model. The computer-implemented method also includes augmenting data for the first data set having an amount of data measured failing to meet a threshold value with a data augment generator. Deficiencies in the variation in the amount of data in the first data set are augmented by the data augment generator using augmentation methods outside the variation scope to provide a second data set of augmented data. An artificial intelligence model is trained with a combined data set of the first data set, and the second data set of augmented data when the first and second data set have an amount of data meeting the threshold value.

In another embodiment, a system for data augmentation to train an artificial intelligence model is described that includes a hardware processor; and a memory that stores a computer program product. The computer product when executed by the hardware processor, causes the hardware processor to analyze a first data set with a data analyzer to measure an amount of data in the data set and the variation in the amount of data in the first data set to determine deficiencies for training an artificial intelligence model. The computer program product also augments data for the first data set having an amount of data measured failing to meet a threshold value with a data augment generator. Deficiencies in the variation in the amount of data in the first data set are augmented by the data augment generator using augmentation methods outside the variation scope to provide a second data set of augmented data. The computer program product also trains an artificial intelligence model with a combined data set of the first data set, and the second data set of augmented data when the first and second data set have an amount of data meeting the threshold value.

In yet another embodiment, a computer program product is described for data augmentation to train an artificial intelligence model. The computer program product includes a computer readable storage medium having computer readable program code embodied therewith. The program instructions executable by a processor to cause the processor to analyze a first data set with a data analyzer to measure an amount of data in the data set and the variation in the amount of data in the first data set to determine deficiencies for training an artificial intelligence model. The computer program product also uses the processor to augment data for the first data set having an amount of data measured failing to meet a threshold value with a data augment generator. Deficiencies in the variation in the amount of data in the first data set are augmented by the data augment generator using augmentation methods outside the variation scope to provide a second data set of augmented data. The computer program product also trains an artificial intelligence model with a combined data set of the first data set, and the second data set of augmented data when the first and second data set have an amount of data meeting the threshold value.

BRIEF DESCRIPTION OF THE DRAWINGS

The following description will provide details of preferred embodiments with reference to the following figures wherein.

DETAILED DESCRIPTION

The present invention generally relates to data enhancement as used in artificial intelligence modeling. It has been determined that for data enhancement, a disadvantage of current methods is the excessive reliance on the subjective understanding, and analysis of datasets by data scientists. Data scientists can take too much time for dataset understanding, especially when the dataset is relatively large. Under those circumstances, it is difficult to perform data enhancements in a reasonably short amount of time. Some examples of existing data enhancement methods include data augmentation based on generative adversarial networks (GAN), and data augmentation based on reinforcement learning. Data augmentation based on generative adversarial networks (GAN) trains a data augmentation generator using a generative adversarial networks (GAN), and then trains the base machine learning model with a data generator. It has been determined that data augmentation based on generative adversarial networks (GAN) has particular drawbacks. For example, it needs extra model training for GAN, and the trained GAN can not transfer to another dataset directly.

Data augmentation based on reinforcement learning defines a search space for augmentation setting, and uses reinforcement learning to find the best search strategy. Data augmentation based on reinforcement learning also has a number of disadvantages. For example, data augmentation based on reinforcement learning can be restricted in the certain data augmentation setting space. Additionally, data augmentation based on reinforcement learning can not adjust augmentation parameters.

The methods, systems and computer program products described herein provide a dataset aware method to automatically perform data augmentation. The present disclosure provides a method that automatically determines whether a data set needs to be augmented in order to provide the basis for training an artificial intelligence model, and then selects a mechanism that is suitable for augmenting the original data set. The methods, systems and computer program products described herein employ a dataset analyzer to understand the volumes of datasets, the distribution of datasets and the features of the dataset. Then based on the dataset analyzer, a data augment generator is employed to generate a suitable dataset. The methods, systems and computer program products described herein can employ artificial intelligence to justify the dataset produced by the data augments generator. The aforementioned concepts can reduce the amount of manual effort.

The method, systems and computer program products of the present disclosure are now described in greater detail with reference to FIGS. 1-7.

Figure 1:
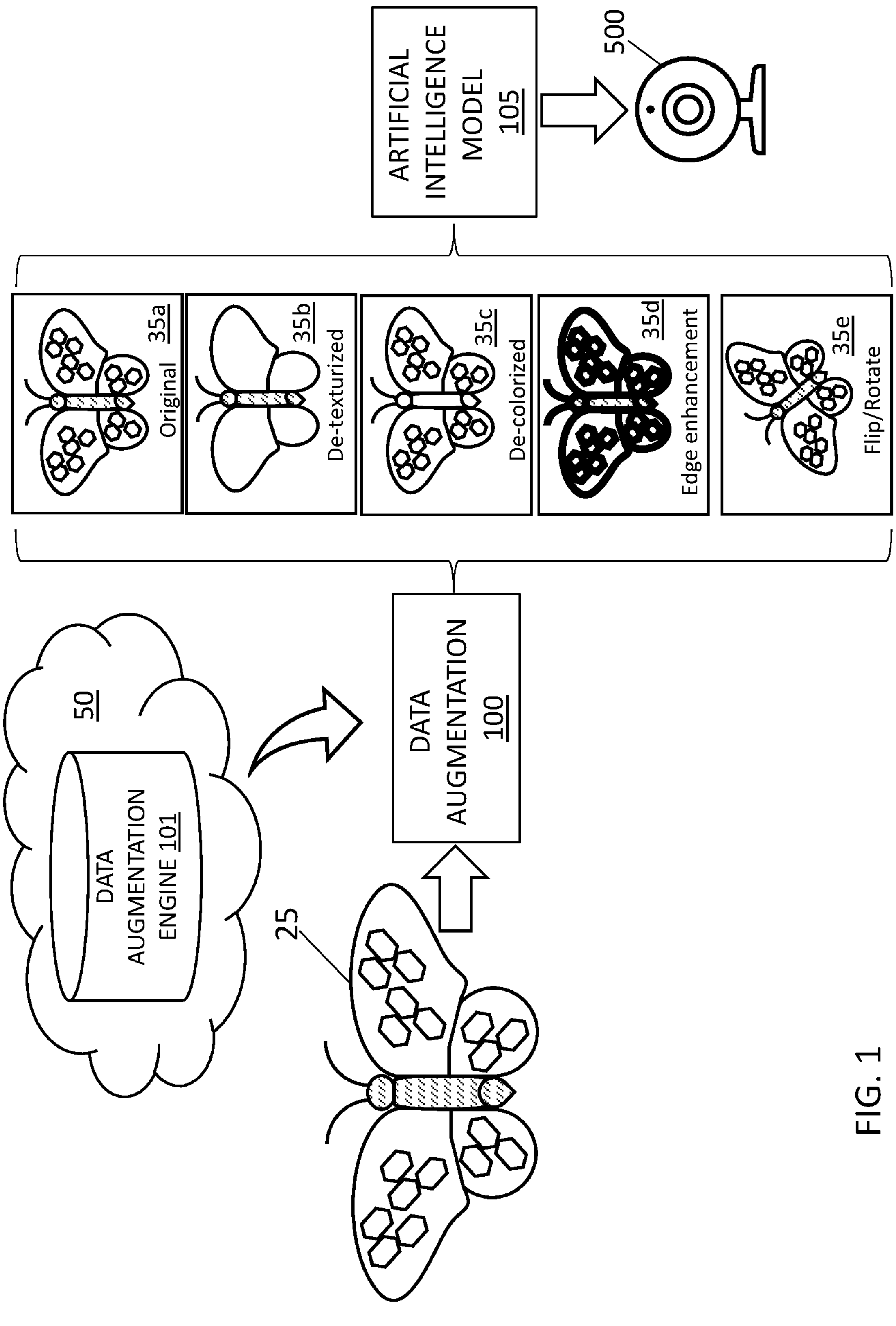
FIG. 1 is an illustration of an example environment in which the methods and systems of the present disclosure may be applied for providing a dataset aware method to automatically perform data augmentation.
Figure 2:
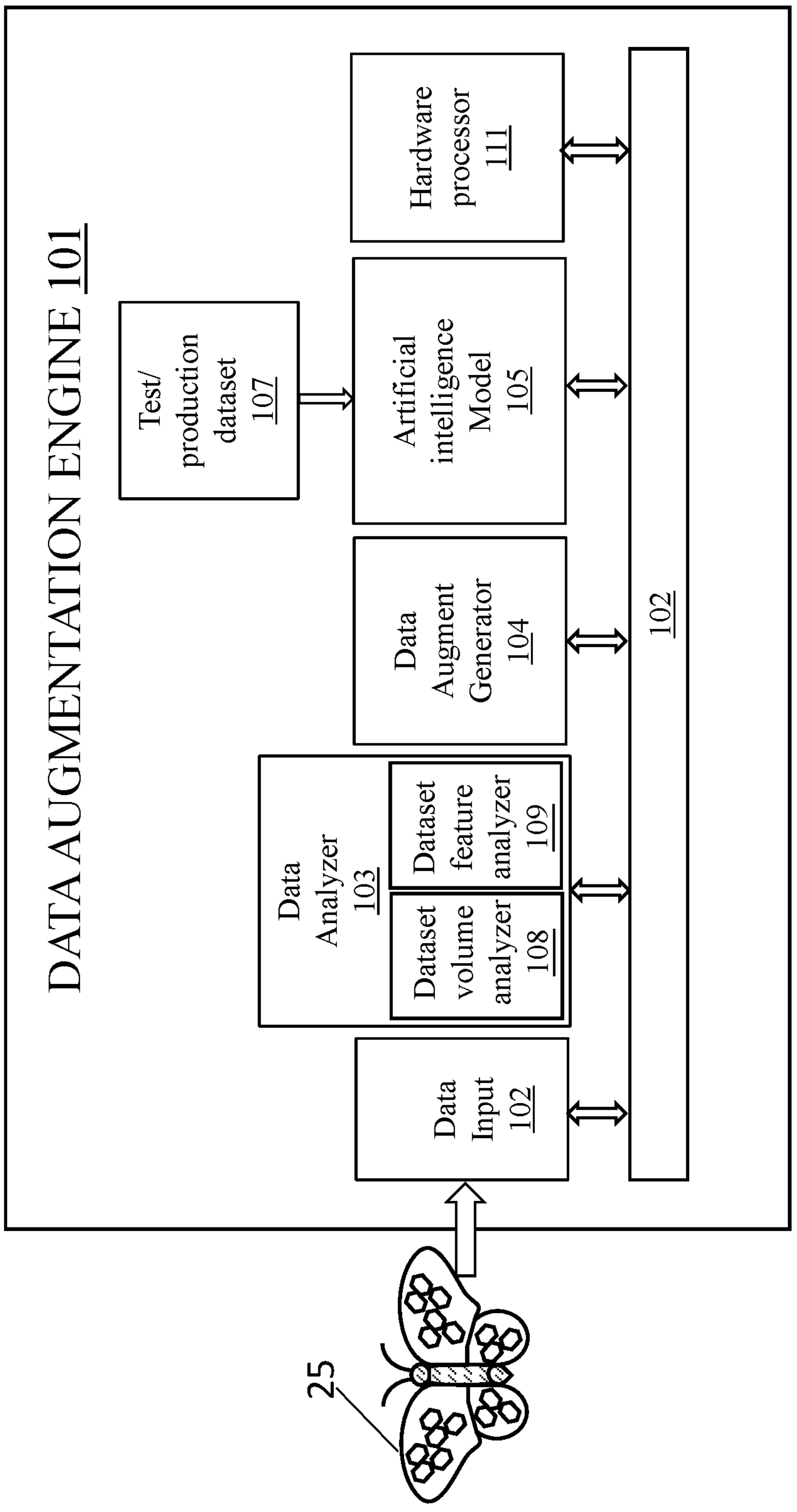
FIG. 2 is a block diagram illustrating a system for performing data augmentation, in accordance with one embodiment of the present disclosure.
Figure 3:
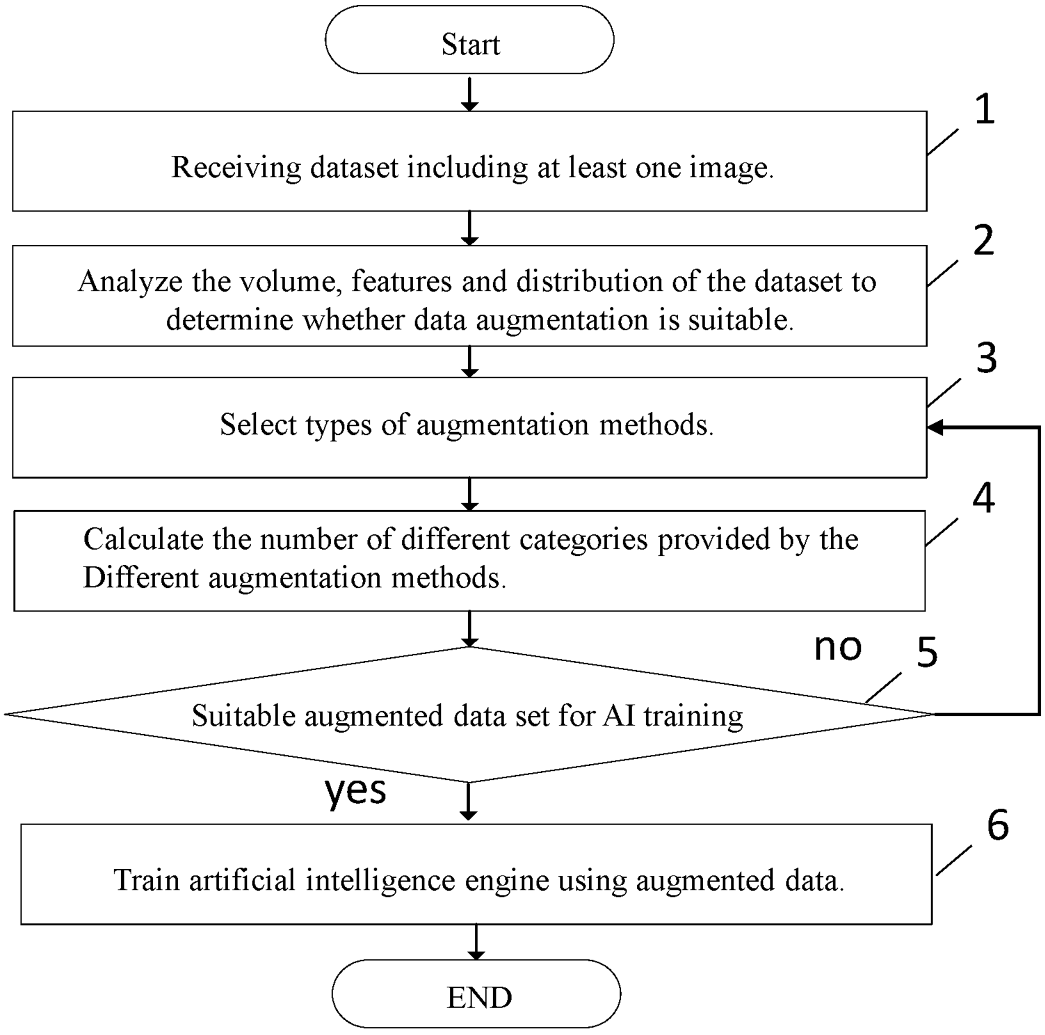
FIG. 3 is a block/flow diagram illustrating a method for providing a dataset aware method to automatically perform data augmentation, in accordance with one embodiment of the present disclosure.

FIG. 1 is an illustration of an example environment in which the methods and systems of the present disclosure may be applied for providing a dataset aware method to automatically perform data augmentation. FIG. 2 is a block diagram illustrating a system, which may be employed in the method depicted in FIG. 2. FIG. 3 is a block/flow diagram illustrating a method for providing a dataset aware method to automatically perform data augmentation.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

FIG. 1 illustrates data augmentation for training data to improve artificial intelligence model generation for applications, such as machine vision. Data augmentation can be used to increase the diversity of training data in order to improve model generalization. Automated data augmentation that searches for data-driven augmentation policies improves the performance of deep models in image recognition compared with the manually designed ones. It is noted that the artificial intelligence model for machine vision is provided for illustrative purposes only, and it is not intended that the present disclosure be limited to only this example.

In the example depicted in FIG. 1, an image 25 is provided, in which the image 25 provides data for training an artificial intelligence (AI) model 200, which can be used in machine vision methods. To provide a greater degree of data for the artificial intelligence (AI) model 200, a data augmentation 100 step is performed. The data augmentation 100 step may modify the original image in a matter that provides a greater number of data points for the same image. For example, the original image 25, e.g., an image of a butterfly, may be an element **35*a* of the data set provided by data augmentation 100. Many methods may be employed to modify the image 25 to provide additional data points, e.g., by data augmentation, that are related to the image 25. For example, data augmentation may include a de-texturing step, in which the texture of the image is removed to provide a de-textured image 35*b* for the data set. As illustrated in FIG. 1, the de-textured image 35*b* has had the texture of the wings of the butterfly removed. In another example, data augmentation may include a de-coloring step, in which the color of the image is removed to provide a de-colored image 35*c* for the data set. In the example depicted in FIG. 1, the original color is illustrated by the cross-hatching on the body of the butterfly of the original image 25. As illustrated in FIG. 1, the de-colored image 35*c* has removed the color of the butterfly, e.g., removes the cross-hatching (representative of color) from the body of the butterfly. In yet another example, data augmentation 100 of the original image 25 may include an edge enhancement. Edge enhancement can include darkening or increasing the line thickness of perimeter structures of the image. For example, the perimeter of the butterfly is clearly depicted in the edge enhancement of the image identified by reference number 35*c* as having a greater line width than the remainder of the image. In an even further example, the data augmentation 100 of the original image 25 can include a flip/rotate process that is applied to the image, as illustrated by reference number 35*d***.

The examples data augmentation depicted in FIG. 1 are only some examples of how an original image can be modified to provide additional data correlated to the original image for training an artificial intelligence model. Other data augmentation methods are also available. For example, the flip/rotate process identified by reference number **35*d* is a geometric transformation. Examples of geometric transformations that are suitable for providing data points for data augmentation can include both vertical and horizontal flip of the image, rotation of the image, cropping of the image, downscaling of the image, and upscaling of the image. In another example, the decoloring data augmentation illustrated by reference number 35*c* is an example of color transformation. Examples of color transformations that are suitable for providing data points for data augmentation 100** can include color conversion, noise directed to color, and coarse dropout.

Other forms of data augmentation of image type data can include SMOTE sampling. SMOTE is an oversampling technique that generates synthetic samples from the minority class. In another example, sample pairing can provide for data augmentation. In sample pairing, a new sample is synthesized from one image by overlaying another image randomly chosen from the training data. In yet another example, mixup is employed for data augmentation. Mixup is a method for training deep neural networks where additional samples are generated during training by convexly combining random pairs of images and their associated labels.

Data enhancement is a step in AI vision model training. In some embodiments, the artificial intelligence model 105 can be used in combination with images recorded by a camera 500 to provide machine vision. A high-quality sample set can be a factor in building a machine learning system. In some embodiments, the use of appropriate data enhancement methods can increase the number of datasets by more than ten times, thereby maximizing the use of each sample in a small sample set, while improving the robustness of the model and preventing overfitting during training, so that the training can get a better machine learning model.

In some embodiments, analysis of the data used for training an artificial intelligence model 105, such as a model employed in machine vision, can begin with a first count of the dataset by category and dataset distribution to determine if data augmentation is needed. In the case of training a model 105 for machine vision needing data augmentation, based on an understanding of the images, a selection of the suitable type of data augmentation is made. More specifically, a determination is made with respect to how much additional data is needed to train an artificial intelligence model 105, such as one for machine vision; and which types of data augmentation are suitable for training the artificial intelligence model based on the original images of the original data set. For example, a data set of all black and white images would likely not benefit from color transformations, however, modification of image textures could be used to augment the data.

FIG. 1 illustrates a data augmentation engine 101, which can be a cloud based system 50. The data augmentation engine 101 employs a method to automatically select data augmentation types and determine the suitable amount of data. Referring to FIGS. 2 and 3, the data augmentation engine 101 includes a data analyzer 103 and a data augment generator 104. The method depicted in FIG. 3 can automatically select the data augmentation method, and determine a suitable volume of data. The dataset analyzer 103 (also referred to as the data analyzer 103) is employed to understand the volumes of the dataset, distribution of data, and the features of the data. Based on the output (analysis) of the dataset analyzer 103, a data augment generator 104 can generate a suitable dataset for training the artificial intelligence model 105. Additionally, test or production datasets 107 may be able to test the artificial intelligence model following training.

Referring to FIG. 3, the method may include block 1, which is receiving a dataset including an image 25 for analysis. FIG. 2 illustrates an image as data being entered into the data input 102 of the data augmentation engine 101. It is noted that the dataset generally includes more than one image. Although FIG. 2 illustrates a single image 25, similar to that depicted in FIG. 1. However, the dataset generally includes a plurality of images. From the dataset, there is a global number of dataset information, and an object number of dataset information. The global number of dataset information is the total number pieces of data. The object number is the total number pieces of data from the global number of dataset information that is particularly of interest to the training of the artificial intelligence model. For example, if a plurality of images of insects was provided in the dataset, and only some were butterflies, if the butterfly images were of interest their number would be the object number of dataset information. Further, the total number of images for the dataset of insects would be the global number.

In a following step, the method may include analyzing the volume, features and distribution of data to determine whether the original data set was suitable for training an artificial intelligence model, or if data augmentation is needed at block 2 of the method depicted in FIG. 3. Referring to FIG. 2, analyzing the volume, features and distribution of data can be provided by the data analyzer 103 of the data augmentation engine 101. The data analyzer 103 includes a dataset volume analyzer 108 and a dataset feature analyzer 109. The data analyzer 103 may include a set of instructions stored in memory that when executed by a hardware processor 111 can perform the functions of the dataset volume analyzer 108 and a dataset feature analyzer 109. The program stored for performing the functions of the data volume analyzer 108 and the dataset feature analyzer 109 may employ artificial intelligence. The artificial intelligence method used to perform the functions of the data analyzer 103 can include decision tree learning, association rule learning, artificial neural networks, deep learning, inductive logic programming, support vector machines, clustering analysis, bayesian networks, reinforcement learning, representation learning, similarity and metric learning, sparse dictionary learning, genetic algorithms, rule-based machine learning, learning classifier systems, and combinations thereof. The remote predictive light setting computing system using machine learning produces a model for providing predictive light characteristics in response to environmental inputs, such as time, weather and calendar date may include a machine learning algorithm that can be selected from the group consisting of: Almeida-Pineda recurrent backpropagation, ALOPEX, backpropagation, bootstrap aggregating, CN2 algorithm, constructing skill trees, dehaene-changeux model, diffusion map, dominance-based rough set approach, dynamic time warping, error-driven learning, evolutionary multimodal optimization, expectation-maximization algorithm, fastICA, forward-backward algorithm, geneRec, genetic algorithm for rule set production, growing self-organizing map, HEXQ, hyper basis function network, IDistance, K-nearest neighbors algorithm, kernel methods for vector output, kernel principal component analysis, leabra, Linde-Buzo-Gray algorithm, local outlier factor, logic learning machine, LogitBoost, manifold alignment, minimum redundancy feature selection, mixture of experts, multiple kernel learning, non-negative matrix factorization, online machine learning, out-of-bag error, prefrontal cortex basal ganglia working memory, PVLV, Q-learning, quadratic unconstrained binary optimization, query-level feature, quickprop, radial basis function network, randomized weighted majority algorithm, reinforcement learning, repeated incremental pruning to produce error reduction (RIPPER), Rprop, rule-based machine learning, skill chaining, sparse PCA, state-action-reward-state-action, stochastic gradient descent, structured kNN, T-distributed stochastic neighbor embedding, temporal difference learning, wake-sleep algorithm, weighted majority algorithm (machine learning) and combinations thereof.

The dataset volume analyzer 108 can determine the global number of dataset information, and the object number of dataset information. In some embodiments, a preset number is selected for these values, in which the preset number indicates a threshold for the data being suitable for training the artificial intelligence (AI) model. If the dataset entered into the data input 102 exceeds the preset number, then the volume of the dataset is suitable for training the artificial intelligence model. If the dataset entered into the data input 102 does not exceed the preset value, then data augmentation is needed. The dataset is then evaluated for object number of the dataset information. This is also calculated by the dataset volume analyzer 108. In some embodiments, a preset number is selected for when the objects in the dataset meet the number needed for training the artificial intelligence model. If the objects in the dataset entered into the data input 102 do not exceed the preset value, then data augmentation is needed.

The data analyzer 103 may include a counter that employs upon machine vision to count the global number of dataset information and the object number of dataset information for the data volume analyzer 108.

When it is determined that the volume of the dataset is indicative of a dataset that would need augmentation to provide for training an artificial intelligence engine, the data feature analyzer 109 extracts the object from the pieces of data in the datasets that are applicable to training the artificial intelligence model 105. Extraction can include cutting the image of interest from a plurality of images in the data. Following extraction of the object, the object can then be analyzed to characterize the data for determining in later process steps what types of data augmentation can be employed to increase the dataset to provide the appropriate amount of data to train an artificial intelligence model 105.

The output from the data feature analyzer 109 can indicate the different types of data variation from the dataset, and from the different types of data variations, the types of data augmentation that can add to the dataset can be considered.

Referring to FIG. 3, at block 3, the method can continue with selecting the types of augmentation methods. Selecting augmentation methods may be performed by the data augment generator 104 of the data augmentation engine 101.

The data augment generator 104 may include a set of instructions stored in memory that when executed by a hardware processor 111 can perform augmentation method selection based on the characteristics of the dataset as analyzed by the data analyzer 103. The program stored for performing the functions of the data augment generator 104 may employ artificial intelligence. The artificial intelligence method used to perform the functions of the data augment generator 104 can include decision tree learning, association rule learning, artificial neural networks, deep learning, inductive logic programming, support vector machines, clustering analysis, bayesian networks, reinforcement learning, representation learning, similarity and metric learning, sparse dictionary learning, genetic algorithms, rule-based machine learning, learning classifier systems, and combinations thereof. The remote predictive light setting computing system using machine learning produces a model for providing predictive light characteristics in response to environmental inputs, such as time, weather and calendar date may include a machine learning algorithm that can be selected from the group consisting of: Almeida-Pineda recurrent backpropagation, ALOPEX, backpropagation, bootstrap aggregating, CN2 algorithm, constructing skill trees, dehaene-changeux model, diffusion map, dominance-based rough set approach, dynamic time warping, error-driven learning, evolutionary multimodal optimization, expectation-maximization algorithm, fastICA, forward-backward algorithm, geneRec, genetic algorithm for rule set production, growing self-organizing map, HEXQ, hyper basis function network, IDistance, K-nearest neighbors algorithm, kernel methods for vector output, kernel principal component analysis, leabra, Linde-Buzo-Gray algorithm, local outlier factor, logic learning machine, LogitBoost, manifold alignment, minimum redundancy feature selection, mixture of experts, multiple kernel learning, non-negative matrix factorization, online machine learning, out-of-bag error, prefrontal cortex basal ganglia working memory, PVLV, Q-learning, quadratic unconstrained binary optimization, query-level feature, quickprop, radial basis function network, randomized weighted majority algorithm, reinforcement learning, repeated incremental pruning to produce error reduction (RIPPER), Rprop, rule-based machine learning, skill chaining, sparse PCA, state-action-reward-state-action, stochastic gradient descent, structured kNN, T-distributed stochastic neighbor embedding, temporal difference learning, wake-sleep algorithm, weighted majority algorithm (machine learning) and combinations thereof.

The data augmentation engine 101 determines what type of augmentation methods are suitable for increasing the dataset to a volume that is suitable for training an artificial intelligence (AI) model 105. For example, in some instances, a suitable volume of data for training a stable artificial intelligence model may include 50 or more elements of data for each category. A category for machine vision is based upon what type of element the machine vision is trying to identify. For example, if the machine vision model is for detecting images of butterflies from a grouping of images for insects, the category would by the type of insects, including the butterfly type. For example, if the dataset provided a category butterfly with only ten examples of different variations, and 50 examples of different variations are needed to provide a stable model, the data augment generator 104 determines the variations needed to increase the data set.

In some embodiments, the data augment generator 104 can select from the different types of augmentation, which can include de-texturing, de-coloring, edge enhancement, a flip/rotate (such as vertical and horizontal flip of the image), cropping of the image, downscaling of the image, upscaling of the image, color conversion, noise directed to color, and coarse dropout, SMOTE sampling, sample pairing, mixup and combinations thereof. From the data feature analyzer 109, a determination has already been made of what types of variations of data were originally present in the dataset. To increase the robustness of the data, the data augment generator 104 selects which types of data augmentation, e.g., from the above list, are suitable for training the artificial intelligence model based on the original images of the original data set. For example, a data set of all black and white images would likely not benefit from color transformations, however, modification of image textures could be used to augment the data.

In one example, the data augment generator 104 may determine that suitable methods to increase the amount of data points for training the artificial intelligence model may benefit from color distribution and rotation of the original images within the dataset.

For example, from the analysis of the original data set, variations of the images of interest may have been provided having different color distributions, different object rotations distribution, different object areas and object similarities of clusters.

To increase the data set for data augmentation, the data augment generator 104 can calculate the color distribution variance as weight. The data augment generator 104 can also combine the rotation and area the variance as weight.

Referring to FIG. 2, in a following step, the method can continue with calculating the number of different categories provided by the different augment methods at block 5. The augmented data set is added to the original data set to determine the overall data content. If the combined data set is now sufficient to train the artificial intelligence (AI) model, the process can continue to the artificial intelligence training step at block 6. If after the augmented data is added to the original data set to determine the overall data content, the process can continue with a repeated step of selecting additional augmentation methods at block 3.

Training of the artificial intelligence model can be described with reference to the neural network of FIG. 4. The neural network depicted in FIG. 4 may provide one example of the artificial intelligence model 105 that is depicted in FIG. 2.

Figure 4:
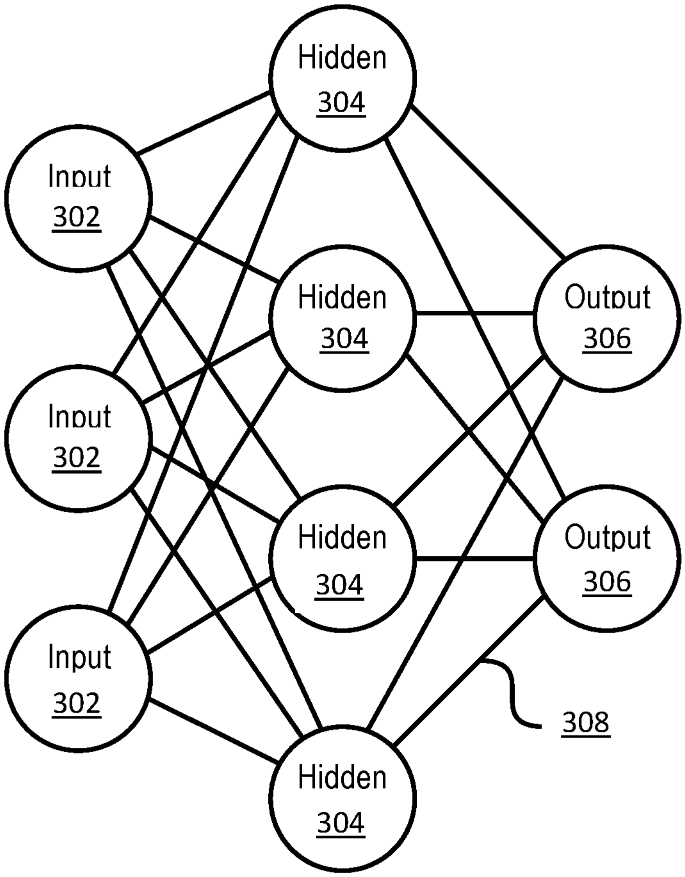
FIG. 4 is a generalized diagram of a neural network.

Referring now to FIG. 4, a generalized diagram of a neural network is shown. Although a specific structure of an ANN is shown, having three layers and a set number of fully connected neurons, it should be understood that this is intended solely for the purpose of illustration. In practice, the present embodiments may take any appropriate form, including any number of layers and any pattern or patterns of connections therebetween.

ANNs demonstrate an ability to derive meaning from complicated or imprecise data and can be used to extract patterns and detect trends that are too complex to be detected by humans or other computer-based systems. The structure of a neural network is known generally to have input neurons 302 that provide information to one or more "hidden" neurons 304. Connections 308 between the input neurons 302 and hidden neurons 304 are weighted, and these weighted inputs are then processed by the hidden neurons 304 according to some function in the hidden neurons 304. There can be any number of layers of hidden neurons 304, and as well as neurons that perform different functions. There exist different neural network structures as well, such as a convolutional neural network, a maxout network, etc., which may vary according to the structure and function of the hidden layers, as well as the pattern of weights between the layers. The individual layers may perform particular functions, and may include convolutional layers, pooling layers, fully connected layers, softmax layers, or any other appropriate type of neural network layer. Finally, a set of output neurons 306 accepts and processes weighted input from the last set of hidden neurons 304.

This represents a "feed-forward" computation, where information propagates from input neurons 302 to the output neurons 306. Upon completion of a feed-forward computation, the output is compared to a desired output available from training data. The training data has been augmented using the methods and systems that has been described with reference to FIGS. 2 and 3.

The error relative to the training data is then processed in "backpropagation" computation, where the hidden neurons 304 and input neurons 302 receive information regarding the error propagating backward from the output neurons 306. Once the backward error propagation has been completed, weight updates are performed, with the weighted connections 308 being updated to account for the received error. It should be noted that the three modes of operation, feed forward, back propagation, and weight update, do not overlap with one another. This represents just one variety of ANN computation, and that any appropriate form of computation may be used instead.

In the present case the output neurons 306 provide analysis of an image in a machine learning application.

To train an ANN, training data can be divided into a training set and a testing set. The training data includes pairs of an input and a known output. The training data has been augmented using the methods and systems that has been described with reference to FIGS. 2 and 3. During training, the inputs of the training set are fed into the ANN using feed-forward propagation. After each input, the output of the ANN is compared to the respective known output. Discrepancies between the output of the ANN and the known output that is associated with that particular input are used to generate an error value, which may be backpropagated through the ANN, after which the weight values of the ANN may be updated. This process continues until the pairs in the training set are exhausted.

After the training has been completed, the ANN may be tested against the testing set, to ensure that the training has not resulted in overfitting. If the ANN can generalize to new inputs, beyond those which it was already trained on, then it is ready for use. If the ANN does not accurately reproduce the known outputs of the testing set, then additional training data may be needed, or hyperparameters of the ANN may need to be adjusted.

ANNs may be implemented in software, hardware, or a combination of the two. For example, each weight 308 may be characterized as a weight value that is stored in a computer memory, and the activation function of each neuron may be implemented by a computer processor. The weight value may store any appropriate data value, such as a real number, a binary value, or a value selected from a fixed number of possibilities, that is multiplied against the relevant neuron outputs. Alternatively, the weights 308 may be implemented as resistive processing units (RPUs), generating a predictable current output when an input voltage is applied in accordance with a settable resistance.

The ANN depicted in FIG. 4 may be employed in a machine vision environment, as depicted in FIG. 1.

For example, following testing of the artificial intelligence model 105 by a test/production dataset 107, as depicted in FIG. 2, the artificial intelligence model 105 may be used in combination with video/camera images taken by a camera 500 to provide for machine vision, as depicted in FIG. 1.

FIG. 2 illustrates one embodiment of a system for increasing classifier accuracy in machine learning applications that includes a hardware processor 111; and a memory that stores a computer program product. The computer program product when executed by the hardware processor 111, causes the hardware processor to analyze a first data set with a data analyzer 103 to determine measure an amount of data in the data set, and the variation in the amount of data in the first data set to determine deficiencies for training an artificial intelligence model 105. The first data set may be an image 25 that is entered into the data input 102 of the system. The computer program product can also augment data for the first data set having an amount of data measured failing to meet a threshold value with a data augment generator 104, wherein deficiencies in the variation in the amount of data in the first data set are augmented by the data augment generator using augmentation methods outside the variation scope to provide a second data set of augmented data. In some embodiments, the system can also train the artificial intelligence model with a combined data set of the first data set and the second data set of augmented data when the first and second data set have an amount of data meeting the threshold value.

The elements of the system, e.g., data augmentation engine 101, such as the data analyzer 102, data augment generator 104, artificial intelligence model 10S and the hardware processor 1121 may be integrated by a bus 102. Further, the data augmentation system 101 depicted in FIG. 2 can be integrated via bus 102 into the processing system 400 depicted in FIG. 5. The processing system 400 includes at least one processor (CPU) 104 (also referred to as hardware processor) operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. The bus 102 interconnects a plurality of components as will be described herein.

As employed herein, the term "hardware processor subsystem" or "hardware processor" can refer to a processor, memory, software, or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 5:
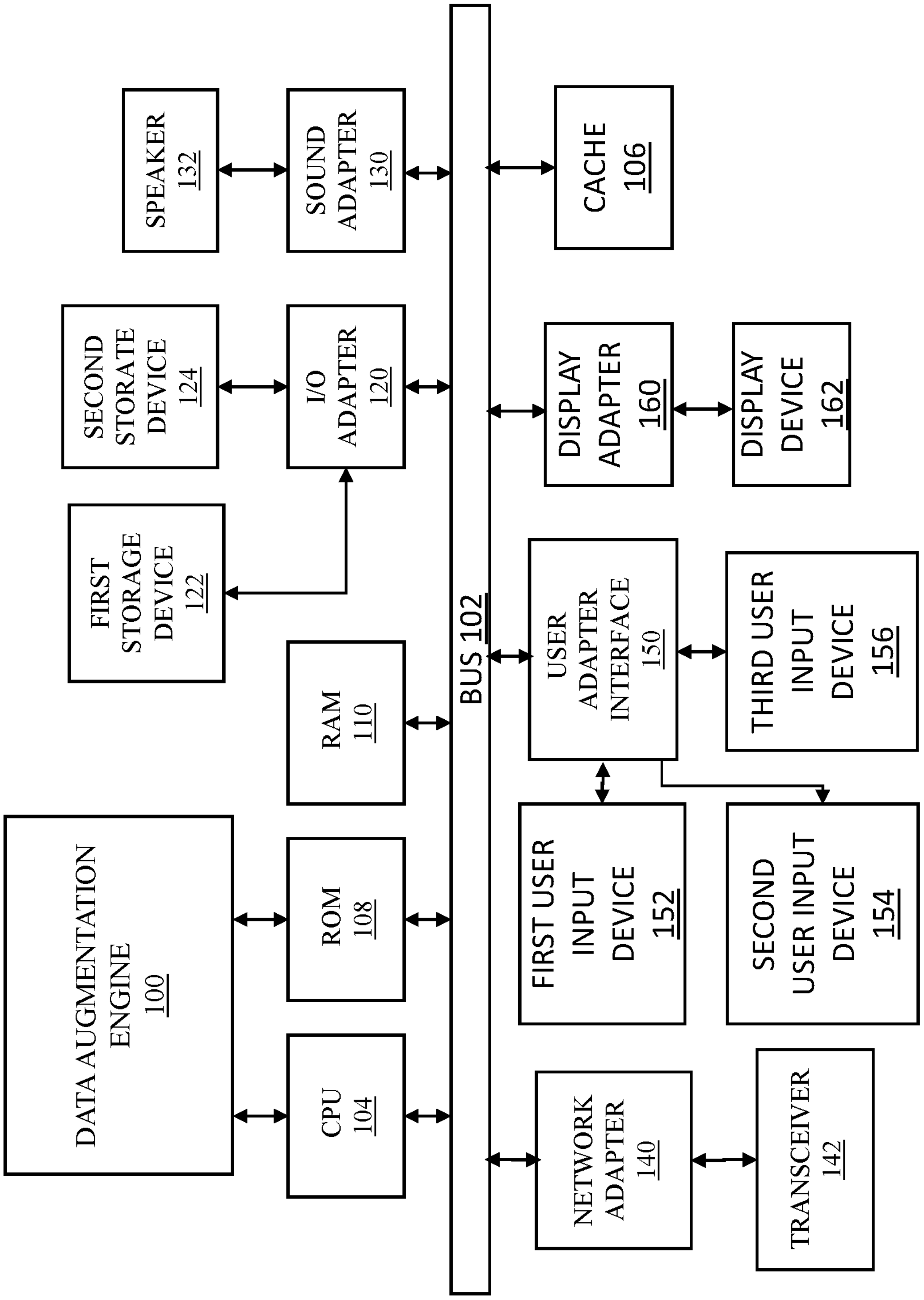
FIG. 5 is a block diagram illustrating a system that can incorporate the data augmentation engine that is depicted in FIG. 3, in accordance with one embodiment of the present disclosure.

The system 400 depicted in FIG. 5, may further include a first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

The present invention may be a system, a method, and/or a computer program product at any possible technical detail level of integration. The computer program product may include a computer readable storage medium (or media) having computer readable program instructions thereon for causing a processor to carry out aspects of the present invention.

For example, the present disclosure provides a computer program product including a non-transitory computer readable storage medium having computer readable program code embodied therein for providing a plurality of questions from a presentation. In some embodiments, the computer program product is for data augmentation to train an artificial intelligence model. The computer program product includes a computer readable storage medium having computer readable program code embodied therewith. The program instructions executable by a processor to cause the processor to analyze a first data set with a data analyzer to determine measure an amount of data in the data set, and the variation in the amount of data in the first data set to determine deficiencies for training an artificial intelligence model; and augment data for the first data set having an amount of data measured failing to meet a threshold value with a data augment generator, wherein deficiencies in the variation in the amount of data in the first data set are augmented by the data augment generator using augmentation methods outside the variation scope to provide a second data set of augmented data. The computer program product can also train, using the processor, the artificial intelligence mode with a combined data set of the first data set and the second data set of augmented data when the first and second data set have an amount of data meeting the threshold value.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The methods of the present disclosure may be practiced using a cloud computing environment. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
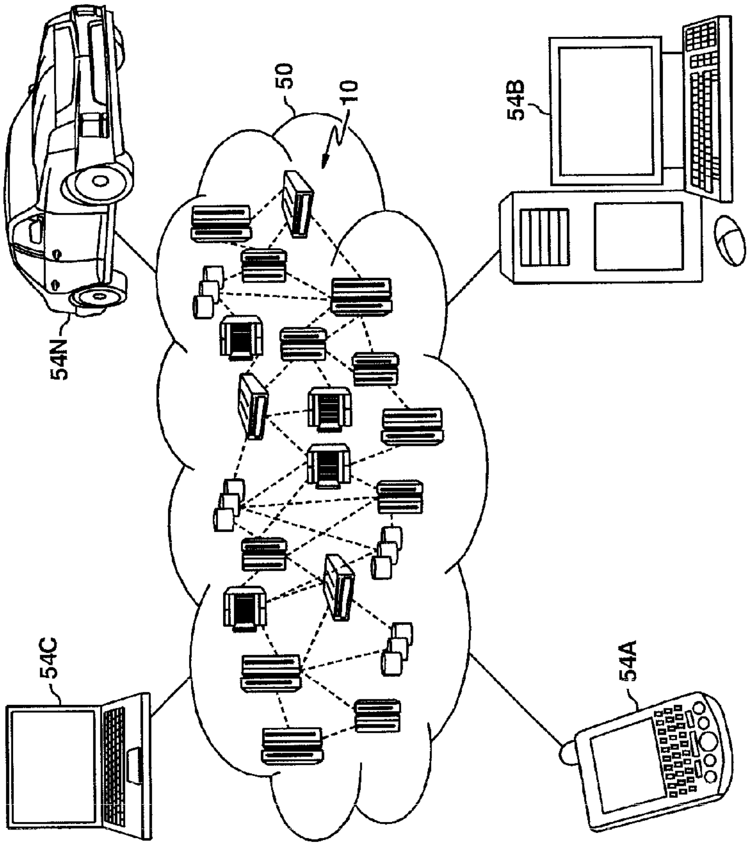
FIG. 6 depicts a cloud computing environment according to an embodiment of the present disclosure.

Referring now to FIG. 6, illustrative cloud computing environment 50 is depicted. As shown, cloud computing environment 50 includes one or more cloud computing nodes 51 with which local computing devices used by cloud consumers, such as, for example, mobile and/or wearable electronic devices 54A, desktop computer 54B, laptop computer 54C, and/or automobile computer system 54N may communicate. Nodes 110 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 51 and cloud computing environment 50 can communicate with any type of computerized device over any type of network and/or network addressable connection (e.g., using a web browser).

Figure 7:
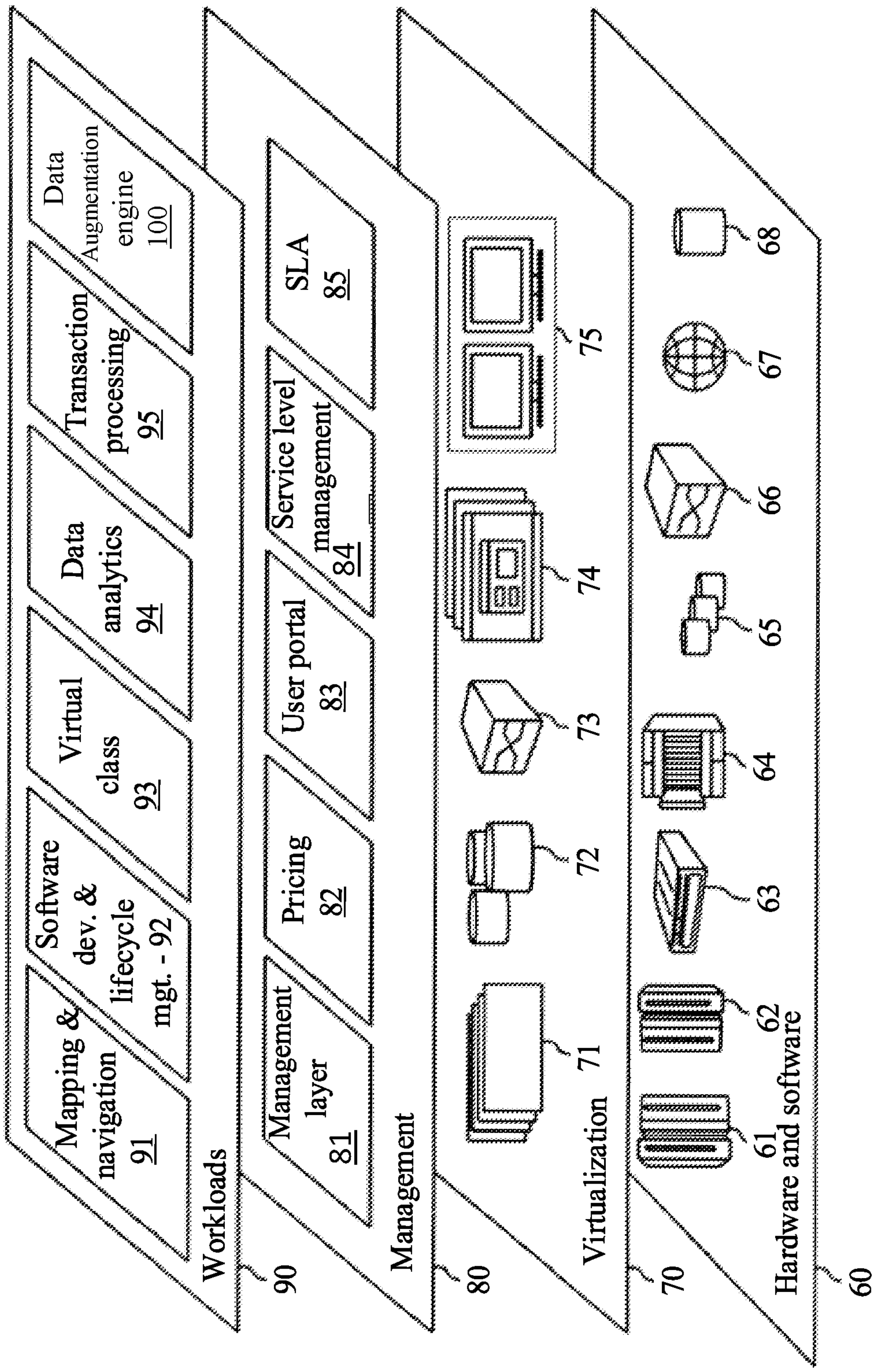
FIG. 7 depicts abstraction model layers according to an embodiment of the present disclosure.

Referring now to FIG. 7, a set of functional abstraction layers provided by cloud computing environment 50 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data augmentation engine 100, which is described with reference to FIGS. 1-6.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Having described preferred embodiments of a system for a dataset aware method to automatically augment data, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for data augmentation to train an artificial intelligence model, the computer-implemented method comprising:

analyzing a first data set comprising a plurality of images, to measure a first volume of data in the first data set and a variation in scope of the first volume of data, wherein the first volume of data and the variation in scope are measured to determine deficiencies for training the artificial intelligence model;

determining a color distribution variance, a rotation distribution variance, and an object area variance in the first data set based on the analyzing, to determine which types of the data augmentation are suitable for the training of the artificial intelligence model;

assigning, based on the color distribution variance, the rotation distribution variance, and the object area variance, varied weights to change a scope of the first data set;

determining variations, in the first volume of data, not present in the first data set that improve using the varied weights;

augmenting, based on the determining of the variations, data for the first data set having the first volume of data measured failing to meet a threshold value, wherein the deficiencies determined in the variation in scope of the first volume of data in the first data set are augmented by automatically using augmentation methods selected for increasing the variation in scope of the first volume of data, and the augmentation methods generate a second data set of augmented data with a second volume of data and the increased variation in scope, to improve robustness in the training of the artificial intelligence model; and training the artificial intelligence model with a combined data set of the first data set and the second data set of the augmented data when the first data set and the second data set have an amount of data meeting the threshold value.

2. The computer-implemented method of claim 1, wherein the artificial intelligence model is for a machine vision application, and the computer-implemented method further comprises detecting objects from each image of the plurality of images for designation of content employing the artificial intelligence model.

3. The computer-implemented method of claim 1, wherein, for each image of the plurality of images, an image type is an object type for being analyzed as the first data set.

4. The computer-implemented method of claim 1, wherein the first volume of data in the first data set includes a measurement of a global number of elements in the first data set and a measurement of an object number of data in the first data set.

5. The computer-implemented method of claim 1, wherein the variation in scope of the first volume of data in the first data set is measured by a method selected from the group consisting of object area histogram analysis, object rotation histogram analysis, grey history analysis, similarity distribution, and combinations thereof.

6. The computer-implemented method of claim 1, wherein the augmenting of the data for the first data set includes a method selected from the group consisting of de-texturing, de-coloring, edge enhancement, a flip/rotate image analysis, cropping of an image of the plurality of images, downscaling of the image, upscaling of the image, color conversion of the image, noise variation directed to color of the image, coarse dropout of the image, SMOTE sampling of the image, sample pairing of the image, mixup analysis of the image, and combinations thereof.

7. The computer-implemented method of claim 1, further comprising recalculating a size of the combined data set to determine if the threshold value has been met.

8. A system for data augmentation to train an artificial intelligence model, the system comprising:

a hardware processor; and a memory that stores a computer program product, which, when executed by the hardware processor, causes the hardware processor to:

analyze a first data set comprising a plurality of images, to measure a first volume of data in the first data set and a variation in scope of the first volume of data, wherein the first volume of data and the variation in scope are measured to determine deficiencies for training the artificial intelligence model;

determine a color distribution variance, a rotation distribution variance, and an object area variance in the first data set, based on the analysis, to determine which types of the data augmentation are suitable for training the artificial intelligence model;

assign, based on the color distribution variance, the rotation distribution variance, and the object area variance, varied weights to change a scope of the first data set;

determine variations, in the first volume of data, not present in the first data set that improve using the varied weights;

augment, based on the determination of the variations, data for the first data set having the first volume of data measured failing to meet a threshold value, wherein the deficiencies determined in the variation in scope of the first volume of data in the first data set are augmented by automatically using augmentation methods selected for increasing the variation in scope of the first volume of data, and the augmentation methods generate a second data set of augmented data with a second volume of data and the increased variation in scope, to improve robustness in the training of the artificial intelligence model; and train the artificial intelligence model with a combined data set of the first data set and the second data set of the augmented data when the first data set and the second data set have an amount of data meeting the threshold value.

9. The system of claim 8, wherein the artificial intelligence model is for a machine vision application, and the computer program product further causes the hardware processor to detect objects from each image of the plurality of images for designation of content employing the artificial intelligence model.

10. The system of claim 8, wherein, for each image of the plurality of images, an image type is an object type for being analyzed as the first data set.

11. The system of claim 8, wherein the first volume of data in the first data set includes a measurement of a global number of elements in the first data set and a measurement of an object number of data in the first data set.

12. The system of claim 8, wherein the variation in scope of the first volume of data in the first data set is measured by a method selected from the group consisting of object area histogram analysis, object rotation histogram analysis, grey history analysis, similarity distribution, and combinations thereof.

13. The system of claim 8, wherein the augmentation of the data for the first data set includes a method selected from the group consisting of de-texturing, de-coloring, edge enhancement, a flip/rotate image analysis, cropping of an image of the plurality of images, downscaling of the image, upscaling of the image, color conversion of the image, noise variation directed to color of the image, coarse dropout of the image, SMOTE sampling of the image, sample pairing of the image, mixup analysis of the image, and combinations thereof.

14. The system of claim 8, wherein the computer program product further causes the hardware processor to recalculate a size of the combined data set to determine if the threshold value has been met.

15. A computer program product for data augmentation to train an artificial intelligence model, the computer program product comprising a computer readable storage medium having computer readable program code embodied therewith, program instructions executable by a processor to cause the processor to:

analyze a first data set comprising a plurality of images, to measure a first volume of data in the first data set and a variation in scope of the first volume of data, wherein the first volume of data and the variation in scope are measured to determine deficiencies for training the artificial intelligence model;

determine a color distribution variance, a rotation distribution variance, and an object area variance in the first data set, based on the analysis, to determine which types of the data augmentation are suitable for training the artificial intelligence model;

assign, based on the color distribution variance, the rotation distribution variance, and the object area variance, varied weights to change a scope of the first data set;

determine variations, in the first volume of data, not present in the first data set that improve using the varied weights;

augment, based on the determination of the variations, data for the first data set having the first volume of data measured failing to meet a threshold value, wherein the deficiencies determined in the variation in scope of the first volume of data in the first data set are augmented by automatically using augmentation methods selected for increasing the variation in scope of the first volume of data, and the augmentation methods generate a second data set of augmented data with a second volume of data and the increased variation in scope, to improve robustness in the training of the artificial intelligence model; and train the artificial intelligence model with a combined data set of the first data set and the second data set of the augmented data when the first data set and the second data set have an amount of data meeting the threshold value.

16. The computer program product of claim 15, wherein the artificial intelligence model is for a machine vision application, and and the program instructions further cause the processor to detect objects from each image of the plurality of images for designation of content employing the artificial intelligence model.

17. The computer program product of claim 15, wherein, for each image of the plurality of images, an image type is an object type for being analyzed as the first data set.

18. The computer program product of claim 15, wherein the first volume of data in the first data set includes a measurement of a global number of elements in the first data set and a measurement of an object number of data in the first data set.

19. The computer program product of claim 15, wherein the variation in scope of the first volume of data in the first data set is measured by a method selected from the group consisting of object area histogram analysis, object rotation histogram analysis, grey history analysis, similarity distribution, and combinations thereof.

20. The computer program product of claim 15, wherein the augmentation of the data for the first data set includes a method selected from the group consisting of de-texturing, de-coloring, edge enhancement, a flip/rotate image analysis, cropping of an image of the plurality of images, downscaling of the image, upscaling of the image, color conversion of the image, noise variation directed to color of the image, coarse dropout of the image, SMOTE sampling of the image, sample pairing of the image, mixup analysis of the image, and combinations thereof.

* * * * *